(No Model.)
A. J. PISTNER.
AXLE SPINDLE.
No. 541,008. Patented June 11, 1895.
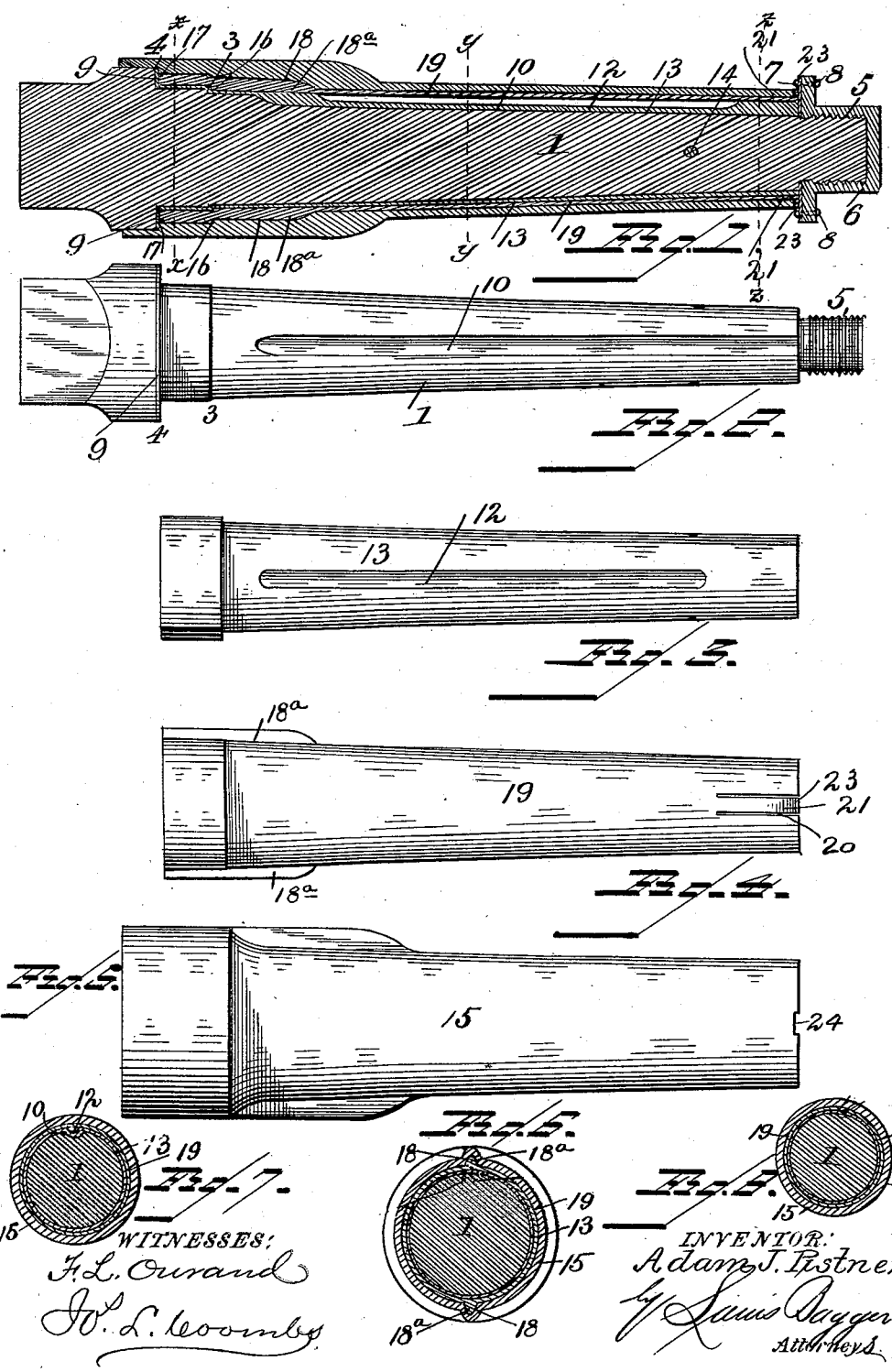

UNITED STATES PATENT OFFICE.

ADAM J. PISTNER, OF ST. MARY'S, PENNSYLVANIA.

AXLE-SPINDLE.

SPECIFICATION forming part of Letters Patent No. 541,008, dated June 11, 1895.

Application filed December 6, 1894. Serial No. 531,057. (No model.)

*To all whom it may concern:*

Be it known that I, ADAM J. PISTNER, a citizen of the United States, and a resident of St. Mary's, in the county of Elk and State of Pennsylvania, have invented certain new and useful Improvements in Axle-Spindles; and I do hereby declare that the following is a full, clear, and exact description of the invention, which will enable others skilled in the art to which it appertains to make and use the same, reference being had to the accompanying drawings, which form a part of this specification.

My invention relates to axle bearings or bushings for wagons, carriages and other similar vehicles, and its object is to provide an improved construction of the same which shall possess superior advantages with respect to efficiency in operation.

The invention consists in the novel construction and combination of parts hereinafter fully described and claimed.

In the accompanying drawings, Figure 1 is a central longitudinal section of an axle bearing or bushing constructed in accordance with my invention. Fig. 2 is a side elevation of the axle-spindle. Fig. 3 is a similar view of the removable sleeve. Fig. 4 is a similar view of the removable lining. Fig. 5 is a similar view of the axle-box. Figs. 6, 7, and 8 are cross-sectional views on lines $x$ $x$, $y$ $y$, and $z$ $z$, respectively, of Fig. 1.

In the said drawings the reference numeral 1 designates an axle spindle, formed with shoulders 3 and 4. The outer end of the spindle is reduced and formed with screw threads 5, to receive the nut 6, provided with a removable washer 7, secured thereto by bolts or rivets 8. A similar washer 9 is secured to the shoulder 4. Upon one side the spindle is formed with a horizontal groove 10, with which engages a rib 12 on the inner side of a metal sleeve 13, adapted to fit over or upon the spindle. This groove and rib prevent the sleeve from rotating upon the spindle, and form a cup or cavity for retaining the lubricating oil or grease; and the sleeve is secured to the spindle by means of a rivet 14. This rivet also aids in preventing the sleeve from turning on the spindle but the groove and rib relieve it from considerable strain.

The numeral 15 designates the axle box, which may be of any ordinary construction, formed on its inner end with annular recesses 16 and 17 corresponding with the shoulders 3 and 4 of the spindle. This box at its inner side is provided with a series of grooves 18, which extend horizontally from the end of the box toward the center thereof. With these grooves engage corresponding ribs $18^a$ of a removable metal lining 19, consisting of a tapering sleeve adapted to fit over the sleeve 13. The outer end of this lining is split as seen at 20, forming spring tongues 21, the ends of which are bent over at a right angle forming lugs 23, which engage with notches or recesses 24 in the outer end of the box. This lining fits snugly in the box, the ribs and grooves preventing it from turning therein and the spring tongues holding it against longitudinal movement.

In assembling the parts together, the sleeve is first placed on the spindle and secured in place thereon by the rivet 14, which together with the groove 10 and rib 12, prevents the sleeve from turning on the spindle. The lining 19 is then inserted in the box 15, the lugs of the spring tongues 21 engaging with the notches 24 and holding the same in place. These tongues and also the ribs $18^a$ and grooves 18, prevent the lining from turning in the box. The box with its lining is then slipped on the sleeve secured to the spindle and the nut 6 screwed on the reduced end of the spindle whereby the box is held thereon.

From the above it will be seen that the sleeve and lining are secured to the spindle and box respectively. Therefore, during the rotation of the wheel all the wear will come upon the said sleeve and lining, which being removable, can be replaced by others when worn. The washers 8 and 9 being also removably connected with the nut and shoulder of the spindle, respectively, can also be replaced by others when desired.

Having thus described my invention, what I claim is—

The combination with the axle spindle having an annular shoulder, a reduced screw-threaded end and a horizontal groove, the removable sleeve formed with a horizontal rib engaging with said groove and the rivet for securing said sleeve to the spindle, the axle box formed with grooves at its inner end, and with notches at its outer end, the removable lining having ribs engaging with the grooves in the box, and having its end slitted forming spring tongues the ends of which are bent outwardly forming lugs engaging with said notches and the nut engaging with the screw-threaded end of the spindle; substantially as described.

In testimony that I claim the foregoing as my own I have hereunto affixed my signature in presence of two witnesses.

ADAM J. PISTNER.

Witnesses:
 MICHAEL BRUNNER,
 GEO. EDWINS.